US008363788B2

(12) United States Patent  (10) Patent No.: US 8,363,788 B2
Flowers et al.  (45) Date of Patent: Jan. 29, 2013

(54) DSL RING SIGNAL COMPATIBILITY (75) Inventors: Mark B. Flowers, Los Gatos, CA (US); John M. Cioffi, Atherton, CA (US); Seong Taek Chung, Redwood City, CA (US)

(73) Assignee: Adaptive Spectrum and Signal Alignment, Inc., Redwood City, CA (US)

( * ) Notice: Subject to any disclaimer, the term of this patent is extended or adjusted under 35 U.S.C. 154(b) by 719 days.

(21) Appl. No.: 12/517,525

(22) PCT Filed: Dec. 7, 2007

(86) PCT No.: PCT/US2007/025134
§ 371 (c)(1),
(2), (4) Date: Dec. 10, 2009

(87) PCT Pub. No.: WO2008/073327
PCT Pub. Date: Jun. 19, 2008

(65) Prior Publication Data
US 2010/0142601 A1  Jun. 10, 2010

Related U.S. Application Data (60) Provisional application No. 60/873,522, filed on Dec. 7, 2006.

(51) Int. Cl.
H04M 1/24 (2006.01)
H04M 3/08 (2006.01)
H04M 3/22 (2006.01)

(52) U.S. Cl. .......... 379/1.04; 379/1.03; 379/29.08; 379/29.09

(58) Field of Classification Search .......... 379/1.03, 379/1.04, 22.03, 24, 27.08, 28, 29.08, 29.09
See application file for complete search history.

(56) References Cited

U.S. PATENT DOCUMENTS

| | | | |
|---|---|---|---|
| 7,076,031 B1 | 7/2006 | Bress et al. | |
| 7,272,209 B2 * | 9/2007 | Jiang et al. | 379/1.04 |
| 7,515,691 B2 * | 4/2009 | Warner et al. | 379/1.04 |
| 8,144,835 B2 * | 3/2012 | Wu et al. | 379/1.04 |
| 2002/0057763 A1 * | 5/2002 | Sisk et al. | 379/1.04 |
| 2004/0028189 A1 * | 2/2004 | Bauer et al. | 379/1.01 |
| 2005/0141673 A1 * | 6/2005 | Lunt et al. | 379/22 |
| 2006/0098725 A1 * | 5/2006 | Rhee et al. | 375/222 |
| 2007/0071229 A1 | 3/2007 | Kozek et al. | |

FOREIGN PATENT DOCUMENTS

| | | |
|---|---|---|
| EP | 1349355 | 10/2003 |
| WO | WO2005-032113 | 4/2005 |

OTHER PUBLICATIONS

Office Action for European Application No. 07867676.4 Mailed May 28, 2010, 4 Pages.
First Office Actino for Chinese Patent Application No. 200780049233.9, Mailed Sep. 26, 2011.
Int'l Searching Authority, "PCT Search Report and Written Opinion of the ISA", Int'l Application No. PCT/US2007/025134, (Jul. 31, 2008), Whole Document.
Int'l Seaching Authority, "PCT International Preliminary Report on Patentability and Written Opinion of the ISA", Int'l Application No. PCT/US2007/025134, (Jun. 18, 2009), Whole Document.

* cited by examiner

*Primary Examiner* — Quoc D Tran
(74) *Attorney, Agent, or Firm* — Blakely Sokoloff Taylor & Zafman, LLP (57) ABSTRACT

A method of detecting that a condition exists that adversely impacts a digital subscriber line service (DSL) over a telephone line shared by the DSL service and a telephone service. The method includes obtaining information regarding operation of the DSL service over a plurality of different time periods, comparing the information for a first of the plurality of time periods with the information for a second of the plurality of time periods, and determining the condition exists based on the comparison.

15 Claims, 8 Drawing Sheets

DSL RING SIGNAL COMPATIBILITY

CROSS-REFERENCE TO RELATED APPLICATIONS

This application is a U.S. National Phase application under 35 U.S.C. §371 of International Application No. PCT/US2007/025134, filed Dec. 7, 2007, entitled DSL RING SIGNAL COMPATIBILITY, which claims priority to U.S. provisional application No. 60/873,522, filed Dec. 7, 2006.

BACKGROUND

1. Field

This invention relates generally to methods, systems and apparatus for managing digital communications systems. More specifically, this invention relates to a DSL system using ring signal conditioning, impedance conditioning and/or other similar device, method or technique to improve high-speed communications.

2. Description of Related Art

Digital subscriber line (DSL) technologies provide potentially large bandwidth for digital communication over existing telephone subscriber lines (referred to as loops and/or the copper plant). Telephone subscriber lines can provide this bandwidth despite their original design for only voice-band analog communication, referred to as Plain Old Telephone Service (POTS). In particular, asymmetric DSL (ADSL) and very-high-speed DSL (VDSL) can adapt to the characteristics of the subscriber line by using a discrete multitone (DMT) line code that assigns a number of bits to each tone (or subcarrier), which can be adjusted to channel conditions determined during initialization and subsequent on-line training known as "bit-swapping" of the modems (typically transceivers that function as both transmitters and receivers) at each end of the subscriber line. Many consumer telephone lines have network electronic devices installed at or near the entry to the customer premise that are designed to provide network maintenance, diagnostic and/or protective functions. These devices have been installed by the telephone companies and are not accessible for modification by the customer or third-party service providers.

While telephone systems provide spectrum separation for POTS and DSL service, such services' co-existence still is complicated by the fact that when POTS was originally defined, only voice-band-type communications and equipment was considered. Consequently, specifications and standards for compatible equipment were very strict in the 0-4 KHz range, but almost non-existent beyond that range. Thus, POTS equipment and operation can produce detrimental interference to DSL systems using higher frequencies and running on the same telephone line/loop as POTS. The result of such interference can include reduced performance (for example, reduced data rates, increased error problems, etc.) and, in some circumstances, data loss or DSL modem disconnection. All these are challenges for successful DSL operation on lines concurrently providing POTS.

Appropriately placed high-pass and low-pass filters (networks that also are referred to as splitters) are utilized to isolate the function of the low frequency POTS service from the function of the high frequency DSL service. At consumer premises, splitters can be 3-ported entities or apparatus—one port for the phone line, a second port for the telephone, and a third port for the ADSL modem. In some situations the splitter is divided into two 2-port devices, one of which is a high-pass filter placed in the ADSL modem, and the second lowpass 2-port, often known as a "micro-filter" interfaces the phone line to the telephone. A splitter in either realization is designed to pass high frequencies (for example, greater than 8 KHz) with little or no attenuation between the line and ADSL port, and to pass low frequencies (for example, below 4 KHz) with little or no attenuation between the line and phone ports. In theory, only linear devices will be attached to the telephone line in which case inclusion of splitters at both the telephone company central office (CO) and consumer premises allows non-interfering operation of POTS and DSL. If a splitter is incorrectly installed or missing altogether at the subscriber premises, the presence of POTS signals, either ringing or voice, can impair the DSL service on the shared line.

However, certain telephone equipment which was not originally designed for DSL operation can introduce non-linear distortion to the phone line. In such circumstances the splitters, which rely on linear system behavior, cannot isolate the POTS line causing detrimental behavior to the DSL service.

A primary source of such POTS interference is triggered by POTS ringing. POTS ringing can cause certain devices to exhibit non-linear behavior because of both high voltages as well as long duration of impulses during the ring period. These devices such as the 6PT in Japan or, more generally, Metallic Distribution Units (or MDUs) or surge protectors located just outside the customer's premises may be inadvertently triggered into modes of non-linear behavior. This non-linear behavior introduces non-linear harmonics and impulses (consequent to ringing) that are on the wrong side of the micro-filter or splitter and thus introduce distortion and impulse impairments directly into the DSL signal. These impulse disturbances are not then reduced at all by the splitter and disrupt DSL service. Conventional approaches to curing the resulting DSL bit-error problems, such as FEC (forward error correction) and interleaving, are helpful, yet still are often not sufficient to reduce problems caused in DSL by POTS interference. The same is true of the situation where a splitter is incorrectly installed or altogether missing.

A 6PT box is a device inserted in (that is, coupled to) Japanese telephone lines to prevent those telephone lines from being affected by abnormally high external voltage, as well as to isolate the customer premises from the network to allow fault isolation. Because the 6PT was not originally designed for DSL compatibility, it can cause problems in DSL service on the same telephone line when the telephone rings. While some 6PT boxes have additional problems due to faulty design, all 6PT boxes have a non-linearity problem that is not a faulty design, it simply is that DSL was not considered when the 6PT devices were designed and installed. The telephone ringing voltage can trigger non-linear loads within the 6PT and/or activate the 6PT device and unintentionally interrupt the DSL service.

Some earlier systems change the DSL signal to avoid the non-linear interruptions. For example, DSL service is suspended or ceased during ring-signal presence. Such a solution, however, is incompatible with many DSL service functions, such as streaming video, music, gaming, etc. Other solutions today include tolerating data errors during incoming ring signals or hiring an authorized network service technician to replace the incompatible network electronic device with a different unit, both of which are undesirable. Moreover, present methods of detection of such a device's presence rely on telephone company records, which are often inaccurate and/or incomplete.

Systems, devices, methods, techniques, etc. that permit normal POTS operation, including telephone ringing, without impairing or causing disconnection of DSL service on the same telephone line in installations that include 6PT, MDU or similar network devices that cause ring signals and their generated impulse disturbances to impair the DSL service would represent a significant advancement in the art. Moreover, systems, devices, methods, techniques, etc. that permit detection of 6PT, MDU and/or other similar network devices likewise would represent a significant advancement in the art. Similarly, systems, devices, methods, techniques, etc. which could analyze the impairments of a 6PT, MDU and/or other similar network device, identify the presence of such devices and/or prescribe the optimal form of a remedy would represent a significant advancement in the art.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

The following detailed description of the invention will refer to one or more embodiments of the invention, but is not limited to such embodiments. Rather, the detailed description is intended only to be illustrative. Those skilled in the art will readily appreciate that the detailed description given herein with respect to the Figures is provided for explanatory purposes as the invention extends beyond these limited illustrative and exemplary embodiments.

Figure 1:
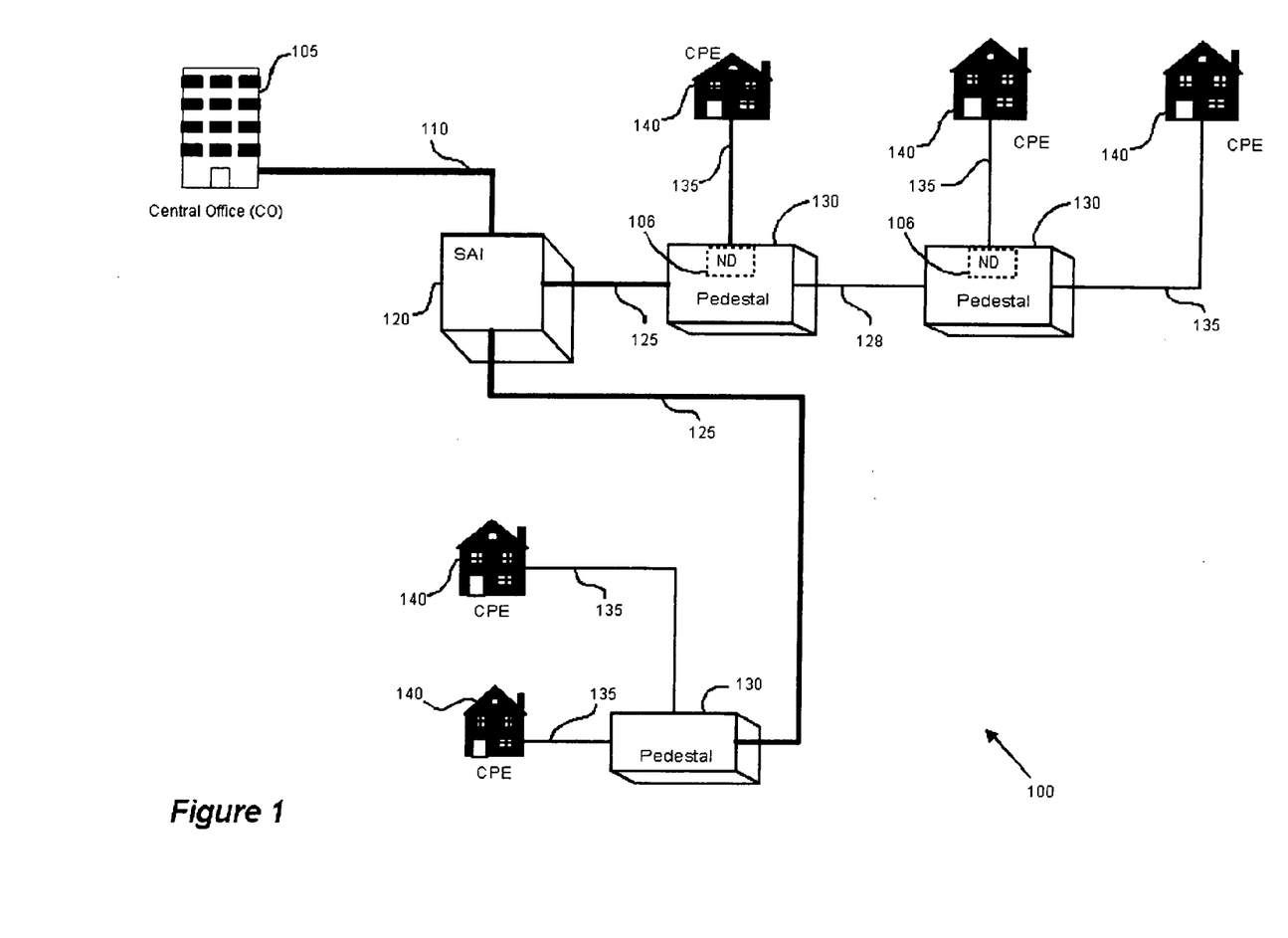
FIG. 1 is a diagram of a typical DSL plant.

Some embodiments of the present invention include one or more methods, techniques, etc. for determining whether an impulse disturbance generating network device (for example, a 6PT device or the like) is present on a given telephone line on which POTS and DSL service are used. For lines where one or more such devices are present, embodiments of the present invention include ring-signal conditioning and/or impedance conditioning, including devices coupled to a DSL loop that is also used for voice communications, such as a system providing POTS. These conditioning techniques and devices, whether alone or in combination, condition ring signals and/or impedances to reduce broadband energy that impairs DSL operation on lines containing a 6PT, MDU or similar device. The term subscriber loop or "loop" refers to the loop that is formed by the line that connects each subscriber or user to the central office (CO) of a telephone operator (or possibly a remote terminal (RT) of such an operator). A typical topology 100 of a DSL plant is presented in FIG. 1. As can be seen, a CO 105 provides high bandwidth transmission via a feeder 110 (which can be a high-bandwidth link, such as fiber optic cable, or a binder with a number of copper lines running through it). The feeder 110 may connect the CO 105 to a serving area interface (SAI) 120 (which may be an optical networking unit or ONU). From interface 120, a number of copper lines 125 may then extend to a pedestal 130 near one or more customer premises equipment (CPE) locations 140. Such pedestals are not uncommon on each block of a street or neighborhood, for example. In some cases, pedestals are intermediate points between a CO, SAI and/or other pedestals. For example, in FIG. 1, an inter-pedestal link 128 allows service for one CPE to be split off, while lines continue on to another pedestal and to one or more other CPEs. Devices which generate non-linear harmonics or impulse disturbances (for example, MDUs, 6PTs, surge protectors, etc.) may be installed somewhere at or between the pedestal and the customer premises. Several such devices 106 are shown in FIG. 1, though they need not be located in the pedestals 130, as shown.

Figure 2:
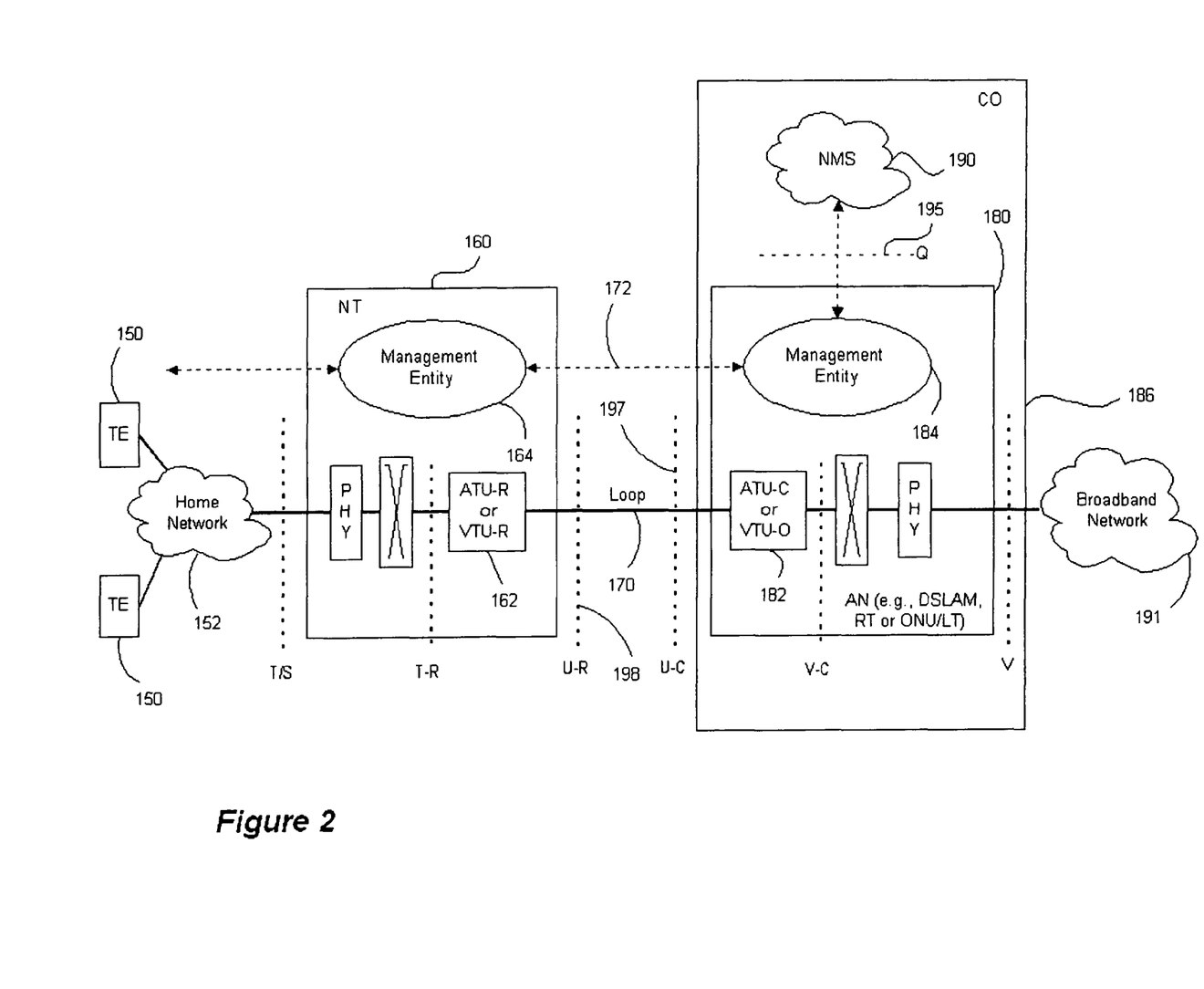
FIG. 2 is a diagram of a typical DSL plant utilizing Dynamic Spectrum Management.

Part of each subscriber loop may be collocated with the loops of other users within a multi-pair binder (or bundle). As seen in FIG. 1, after the pedestal 130, very close to the CPE 140, one or more loops take the form of a drop segment 135 that exits the bundle. The subscriber loop can thus traverse different environments, both inside and outside a binder environment. FIG. 2 shows the reference model system according to the ITU standard G.997.1 (G.ploam), which applies to various ADSL and VDSL systems, which is well known to those skilled in the art, and in which embodiments of the present invention can be implemented. This model applies to ADSL and VDSL systems meeting the various standards that may or may not include splitters, such as ADSL1 (G.992.1), ADSL-Lite (G.992.2), ADSL2 (G.992.3), ADSL2-Lite (G.992.4), ADSL2+ (G.992.5), VDSL1 (G.993.1) and other G.993.x emerging VDSL standards, as well as the G.991.1 and G.991.2 SHDSL standards, all with and without bonding. These standards, variations thereto, and their use in connection with the G.997.1 standard are all well known to those skilled in the art.

In FIG. 2, customers' terminal equipment 150 is coupled to a home network 152, which in turn is coupled to a network termination unit (NT) 160. In the case of an ADSL system, NT 160 includes an ATU-R 162 (for example, a modem, also referred to as a transceiver in some cases, defined by one of the ADSL and/or VDSL standards) or any other suitable network termination modem, transceiver or other communication unit. The remote device in a VDSL system would be a VTU-R. As will be appreciated by those skilled in the art and as described herein, each modem interacts with the communication system to which it is connected and may generate operational data as a result of the modem's performance in the communication system.

NT 160 also includes a management entity (ME) 164. ME 164 can be any suitable hardware device, such as a microprocessor, microcontroller, or circuit state machine in firmware or hardware, capable of performing as required by any applicable standards and/or other criteria. ME 164 collects and stores performance data in its MIB, which is a database of information maintained by each ME, and which can be accessed via network-management protocols such as SNMP (Simple Network Management Protocol), an administration protocol used to gather information from a network device to provide to an administrator console/program or via TL1 commands, TL1 being a long-established command language used to program responses and commands between telecommunication network elements.

Each ATU-R in a system is coupled to an ATU-C in a CO or other upstream and/or central location. In a VDSL system, each VTU-R in a system is coupled to a VTU-O in a CO or other upstream and/or central location (for example, any line termination device such as an ONU/LT, DSLAM, RT, etc.). In FIG. 2, ATU-C 182 is located at an access node (AN) 180 in a CO 186. AN 180 may be a DSL system component, such as a DSLAM, ONU/LT, RT or the like, as will be appreciated by those skilled in the art. An ME 184 likewise maintains an MIB of performance data pertaining to ATU-C 182. The AN 180 may be coupled to a broadband network 191 or other network, as will be appreciated by those skilled in the art. ATU-R 162 and ATU-C 182 are coupled together by a loop 170, which in the case of ADSL (and VDSL) typically is a telephone twisted pair line that also carries other communication and/or data transmission services, including POTS.

The G.997.1 standard specifies an optional OAM (operations, administration and maintenance) communication channel across the U-interface. If this channel is implemented, ATU-C and ATU-R pairs may use it for transporting physical layer OAM messages. Thus, the transceivers 162, 182 of such a system share various operational and performance data maintained in their respective MIBs.

More information can be found regarding ADSL NMSs (network management system) in DSL Forum Technical Report TR-005, entitled "ADSL Network Element Management" from the ADSL Forum, dated March 1998. Also, more information may be found in DSL Forum Technical Report TR-069, entitled "CPE WAN Management Protocol" from the DSL Forum, dated May 2004. Finally, DSL Forum Technical Report TR-064, entitled "LAN-Side DSL CPE Configuration Specification" from the DSL Forum, dated May 2004. These documents address different situations for CPE side management and the information therein is well known to those skilled in the art. More information about VDSL can be found in the ITU standard G.993.1 (sometimes called "VDSL1") and the emerging ITU standard G.993.2 (sometimes called "VDSL2"), as well as several DSL Forum working texts in progress, all of which are known to those skilled in the art. For example, additional information is available in the DSL Forum's Technical Report TR-057 (Formerly WT-068v5), entitled "VDSL Network Element Management" (February 2003) and Technical Report TR-065, entitled "FS-VDSL EMS to NMS Interface Functional Requirements" (March 2004) as well as in the emerging revision of ITU standard G.997.1 for VDSL1 and VDSL2 MIB elements, or in the ATIS North American Draft Dynamic Spectrum Management Report, NIPP-NM2005-031.

It is less common for lines sharing the same binder to terminate on the same line card in ADSL, than it is in VDSL. However, the discussion of xDSL systems may be extended to ADSL, also, because common termination of same-binder lines might also be done (especially in a newer DSLAM that handles both ADSL and VDSL). In a typical topology of a DSL plant, in which a number of transceiver pairs are operating and/or available, part of each subscriber loop is collocated with the loops of other users within a multi-pair binder (or bundle). After the pedestal, very close to the Customer Premises Equipment (CPE), the loop takes the form of a drop wire and exits the bundle. Therefore, the subscriber loop traverses two different environments. Part of the loop may be located inside a binder. After the pedestal, the drop wires are unshielded.

When an existing telephone line is upgraded to DSL service it typically is impractical and/or costly to examine the line closely to determine whether a disruptive device is on the line and/or to modify the line and/or any network electronic devices installed at or adjacent to the customer premises. Therefore, it is helpful to be able to detect automatically whether network devices are present on the line using DSL management and likewise is important that the CPE DSL equipment perform properly in the presence of such devices. However, as noted above, some existing network devices create non-linearities or connection disruptions such that the DSL data transmission is degraded, inhibited, disrupted or discontinued when the phone rings. Often an incoming ring signal will trigger the non-linear disturbances or disruptions, however, some devices present non-linear disturbances at all times. One example of a network device that can create non-linearity issues is a 6PT device, such as those found in Japan and elsewhere (devices that cause these and similar problems may be referred to herein as "disruptive network devices").

These disruptive network devices typically provide protective functions from damaging lightning strikes, etc. and/or provide diagnostic assistance to operators and the like. Moreover, detecting DSL-disrupting devices by observation of management information base data is desirable. The protective function may be supplied by a surge protector, a device intended to block large voltages into the line from harming customer equipment. In some cases, ring signals can exceed the levels required to enable the surge protector, causing non-linear distortion of the ring signal, which subsequently affects the DSL frequency band. Thus non-linear noise can cause poor performance in the form of errors, thereby disrupting video or other services, or causing the modems to retrain in some cases. Such faulty operation or design of the surge protectors is not usually evident on non-DSL lines because the ring telephony function nevertheless continues in the presence of the faulty surge protector. In addition, the diagnostic function sometimes includes circuit elements that create non-linear loads and DSL operational impairments.

Figure 3:
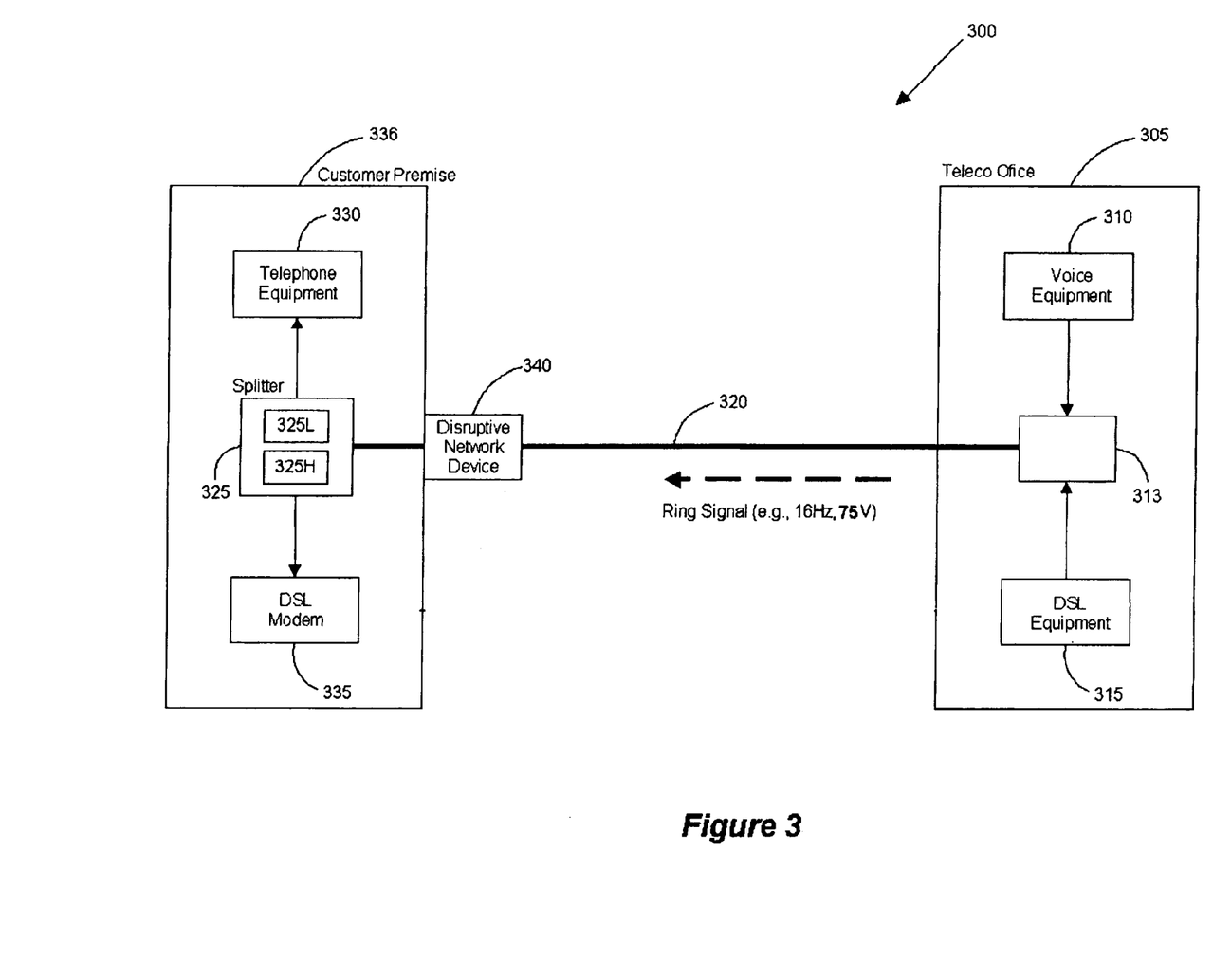
FIG. 3 is a schematic block diagram showing the relevant portions of a DSL system that can implement one or more methods, systems and/or other embodiments of the present invention.

As seen in FIG. 3, voice service 310 and DSL service 315 are provided from a telco office or the like 305 on a shared telephone line 320 to a customer's premises 336, where a splitter 325 directs low frequency signals to telephone equipment 330 and high frequency signals to DSL customer equipment 335. A disruptive network device 340 (for example, a 6PT device, MDU or the like) is situated on the line 320. When a ring signal (typically sent at 16 or 20 Hz frequency) is sent from the telco premises 305 to the customer's telephone equipment 330, the ring signal can have one or more effects on the line equipment. First, the high voltage of the ring signal can trigger a shut down of the line by the disruptive network device 340, which can happen for example when a 6PT device switches into a self-test mode after being hit with a high voltage. Additionally, the combination of the high voltage ring signal and network device frequently generates high frequency interference that is passed to the DSL equipment 335 via splitter 325. This interference often is significant and can cause errors, a retrain of the DSL modem or otherwise shut down operation of the DSL equipment 335. The ringing signals can also be so large as to exceed surge-protector thresholds in device 340, causing device 340 to disrupt the line conductivity in the DSL signal bandwidth. In some installations the disruptive network device 340 may generate non-linear loads to the DSL signals without ring present. In any one of these instances, operation of the DSL equipment 335 is disrupted. This is especially troubling when a streaming-type service (for example, video, gaming, etc.) is in use.

Embodiments of the present invention include systems, methods, apparatus, etc. for detecting whether a disruptive network device is present on a given telephone line. Two exemplary disruptive network device detection methods are provided herein as illustrative embodiments of the present invention. Both detection methods use information that typically is available from the DSL system's DSLAM and/or CPE modem. Many types of data can be used by the detection methods of the present invention, including: upstream and/or downstream code violations, upstream and/or downstream FEC codeword-correction indicators (Reed Solomon decoders used in most DSLs provide an indication for each and every codeword when errors have been corrected and also when the device has failed to correct), upstream and/or downstream errored seconds, upstream and/or downstream attenuation, upstream and/or downstream margin, Hlog per tone, bit distribution per tone, QLN per tone, a non-linearity indicator, etc.

Embodiments of the present invention also treat, condition, etc. the ring signal from the telco premises 305 and/or modify the line/network impedance so that the ring signal does not (1) trigger a self-test mode, (2) cause surge-protector voltage limits to be exceeded, (3) cause non-linearity, or (4) shutdown of the network device 340. In such cases when using embodiments of the present invention, the combination of the disruptive network device and ring signal does not cause high frequency interference that disrupts DSL service on line 320. In addition, embodiments of the present invention may modify the line/network termination impedance such that the disruptive effects of non-linear loading by disruptive network devices in the absence of ringing are also reduced.

Figure 4:
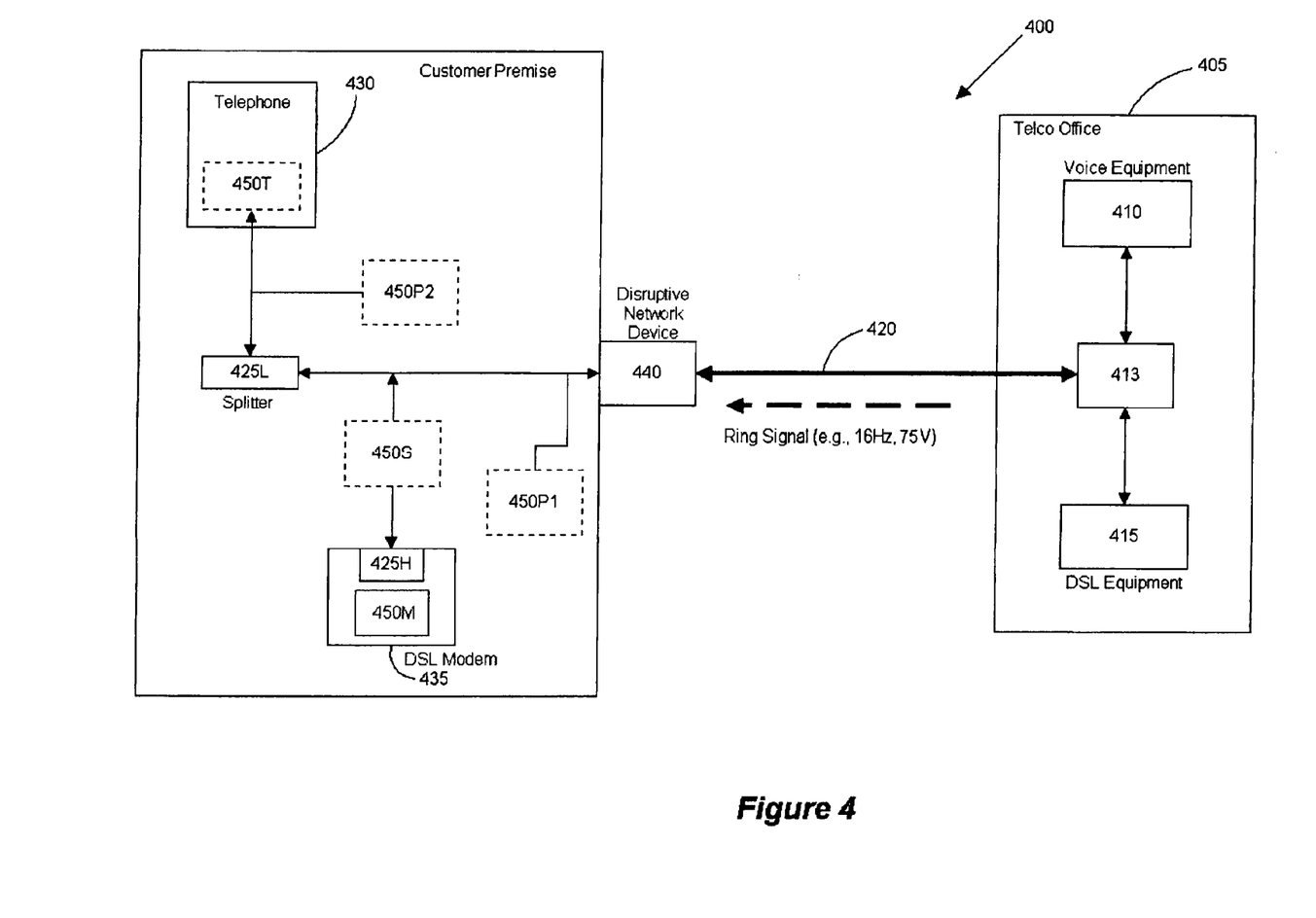
FIG. 4 is a schematic block diagram showing the relevant portions of another DSL system implementing one or more methods, systems and/or other embodiments of the present invention.

As seen in FIG. 4, in some embodiments, one or more conditioning devices 450 can be coupled to the line 420. Ring signal conditioning devices (for example, devices like those shown in FIG. 5A can be coupled to the network of FIG. 4 at 450P1 (when integrated with a filter) or at 450P2 or 450T (when relying on filter 425L)) modify the ring signal such that it does not disturb the 6PT or other disruptive network device as much. Impedance conditioning devices (for example, devices like those coupled to the network of FIG. 4 at 450P1 (for devices like those shown in FIG. 5B or 5C) or at 450S (for two port devices like those shown in FIG. 5D) modify the line impedance (as opposed to the ring signal itself) such that impairments generated by the 6PT or other disruptive network device do not cause as many data errors. These devices can be coupled to the network in series (that is, in a pass-through mode) with the DSL modem 435 or in parallel with the DSL modem 435 (including being a "plug in" to a customer premises system and/or integrated into one or more telephones 430 at the customer's premise). The phrases "coupled to" and "connected to" and the like are used herein to describe a connection between two elements and/or components and are intended to mean coupled either directly together, or indirectly, for example via one or more intervening elements.

As examples of devices that can be used in accordance with embodiments of the present invention, two basic types of devices are shown. As seen in FIG. 4, a first device 450P2 (or 450T) functions to assist in cases that protect against nonlinear distortion introduced by activated surge devices during ringing. Such a device 450P2 (or 450T) can be coupled to the system in parallel (illustrated as device 450P2), in series (illustrated as device 450T), or be incorporated into micro-filter 425L. This type of device, when combined with a micro-filter, can be incorporated into a DSL modem (illustrated as device 450M). A second type of device 450S or 450P1 is used to modify the impedance. Such a device 450P1 can be coupled to the system in parallel (illustrated as device 450P1), in series (illustrated as device 450S), or incorporated into a DSL modem (illustrated as device 450M). Additionally, either type of device can be integrated into a micro-filter such as filter 425L.

As will be appreciated by those skilled in the art, in some of these embodiments, devices 450 (together with associated filters, if needed) can be plugged into an unfiltered telephone jack at the customer premises by the customer or a third party service and/or equipment provider (some installations in the United States filter all phone jacks at the entry point and run a dedicated DSL line).

Devices according to embodiments of the present invention can be installed in a home for which the problem is known to exist or has been detected. The detection process might include observation of time-varying FEC and/or CV counts collected by a management entity such as device 184 of FIG. 2 or other external management entity (for example, a DSM center, DSL optimizer, computer system, etc.). Other useful collected data might include retrain counts, telephone ring times, and/or loss of service, signal, or synchronization signals. Identification of a signature pattern on any or all these collected data would allow reliable detection of the presence of the offending network device (such as a 6PT or similar box) and thus allow a service provider to evaluate whether to install a ring-signal and/or line impedance conditioning device or not.

Unlike earlier solutions to the disruptive network device interference problem in DSL systems, embodiments of the present invention make no changes to the DSL system and its operation, and instead change the line's functional behavior by adding one or more components that draw sufficient current and/or modify impedance in the appropriate band so that the POTS signals have a less adverse effect when passing through a disruptive network device 340.

FIGS. 5A-5E illustrate several devices that can condition a ring signal and/or line impedance according to embodiments of the present invention. The exemplary devices of FIGS. 5A-5E can be used alone (that is, individually) or in combination (either as discrete individual components or combined into a single device, as will be appreciated by those skilled in the art) to achieve desired performance and protection of DSL signaling at the customer's premises. Each device in FIGS. 5A-5E includes one or more connectors 559, or a single plug in line, each of which can contain two or more wires for attachment to the telephone line of the network. A conditioning device circuit is coupled to each of connectors 559 as illustrated in the Figures and described herein.

Figure 5A:
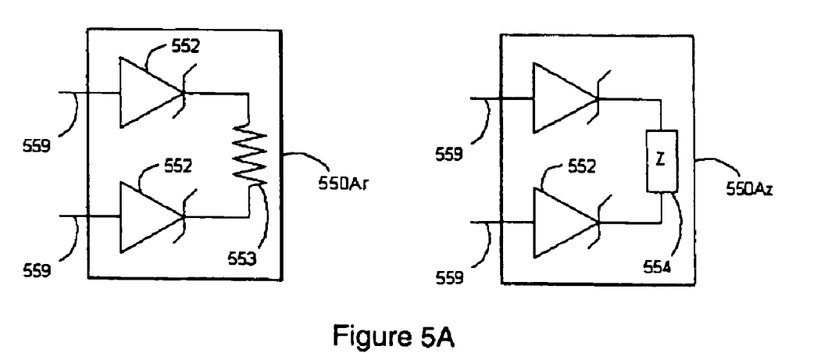
FIGS. 5A-5E illustrate various circuit realizations of a conditioning module that is attached to the phone line at the customer premises.

FIG. 5A illustrates a voltage limiting and/or waveform correction device 550Ar that includes a pair of Zener diodes 552 (for example, 75V Zener diodes) coupled to a resistor 553 (for example, a 43 ohm resistor). An analogous device 550Az substitutes a generalized impedance Z 554 for the resistor 553 of device 550Ar. As will be appreciated by those skilled in the art, various embodiments of this type of device could be placed in parallel in a network configuration, for example as one or more of the devices 450P2 in FIG. 4, to reduce high voltage effects that might otherwise trigger a self-test mode, enable surge protectors, induce high frequency interference, etc., adversely affecting DSL operation. Such devices 550A can modify waveforms by selectively applying loads to high-voltage portions and/or components of the transmitted ring-signal waveform to mitigate the problems caused by these high voltage features. Device 550A can be coupled directly to the line, in parallel with the customer's telephone (that is, in a location that is isolated from the DSL signals by a micro filter). Alternately, a filter can be integrated into device 550A to enable direct coupling to the DSL modem 435.

Figure 5B:
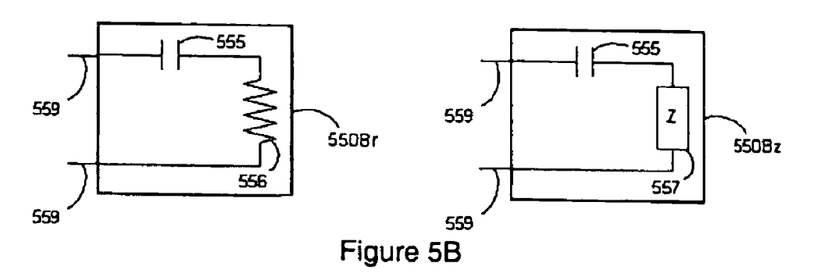

FIG. 5B shows a circuit 550Br that modifies the impedance of a network such as the network 400 shown in FIG. 4, by lowering or otherwise modifying the broadband impedance of the network to reduce the DSL line impedance for the purpose of mitigating the effects of non-linear loads and/or high voltages from ring signals on DSL equipment and operation. Reducing the DSL line terminating impedance serves to mitigate the effects of non-linear loads by providing a lower linear impedance in parallel with the non-linear load thereby increasing the linearity of the signal that is imparted across the parallel combination of the terminating impedance and the non-linear load. Circuit device 550Br includes a capacitance 555 (for example, 0.01 µf) in series with a resistor 556 (for example, a 43 ohm resistor). Device 550Bz is generalized so that a general impedance Z 557 is used in lieu of the resistor 556 of device 550Br. Such a device can be coupled to the unfiltered line such as device 450P1 in FIG. 4.

Figure 5C:
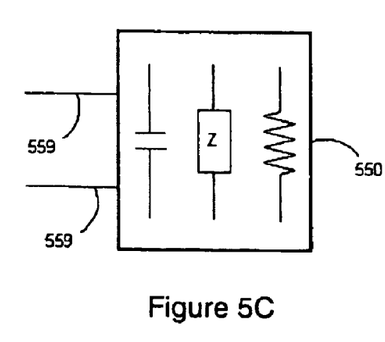

FIG. 5C shows a generalized frequency-dependent impedance circuit 550, comprised of resistance, impedance, inductance and/or capacitance components, that provides frequency-dependent impedance modification such that the DSL modem modifies bit distributions in a manner that reduces the DSL modem's susceptibility to broadband impairments caused by 6PT or similar devices. One such implementation loads the lower frequencies so that the more susceptible high-bit-per-tone carriers have reduced numbers of bits per tone. Devices of the type 550C can be coupled directly to the unfiltered line such as device 450P1 in FIG. 4.

Figure 5D:
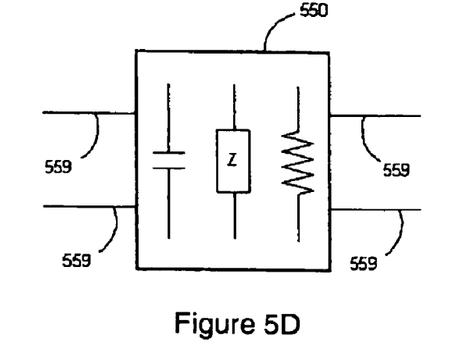

FIG. 5D shows a serial embodiment of device 550C. In this embodiment the device can be connected in series with the customer's DSL modem such as device 450S in FIG. 4.

Figure 5E:
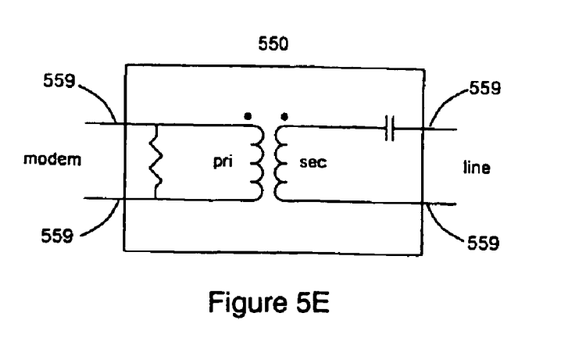

Finally, FIG. 5E shows a serial embodiment of device 550B. The serial embodiment of device 550E utilizes a transformer to perform an impedance conversion such that the line is terminated with the desired reduced impedance and the DSL modem sees the desired nominal impedance in order to achieve a small local echo. Impedance element Z helps to achieve this impedance condition. In addition, 550E utilizes the transformer to reduce insertion loss relative the parallel embodiment of 550B. Embodiment 550E may optionally include a voice pass filter for applications in which the DSL modem requires voice band signals such as modems with integrated VoIP (Voice over IP) functions.

Some embodiments of the present invention make the telephone line 420 of FIG. 4 appear longer (that is, more attenuating) for the high voltage component of the ring signal transmitted from the telco premises 405. Such "long loop emulator" circuits can assume a variety of configurations, as will be appreciated by those skilled in the art. Moreover, device 550 can be configured to provide a frequency-selective complex impedance that mitigates effects on non-linearities seen in and/or caused by network devices, where such non-linearities can cause DSL retraining and/or other problems. As will further be appreciated by those skilled in the art, combinations of devices such as those shown in FIGS. 5A-5E also can be used in networks like network 400. As seen in FIG. 4, two or more circuits are coupled to the network 400. Each such mitigation device can be a single circuit or a combination of two or more such circuits. Also, multiple devices can be coupled to the network easily at the customer's premises, including being integrated into voiceband equipment, such as telephone 430 of FIG. 4. A device such as device 450T integrated into telephone 430 allows a customer using a network like network 400 to merely purchase a telephone unit that will avoid the ring-signal problems discussed herein.

Other embodiments of the present invention provide systems, methods, etc. that permit detection of a disruptive network device or a missing splitter on a telephone line using information that typically is available from the DSL system's DSLAM and/or CPE modem. Many types of data can be used by the detection methods of the present invention, including: code violations (upstream and/or downstream), FEC corrections (that is a specific indicator provided by standardized modems that indicates whether the Reed Solomon Decoder has actually corrected errors in the current received codeword's decoding for upstream and/or downstream), errored seconds (upstream and/or downstream), attenuation (upstream downstream), margin (upstream/downstream), Hlog per tone, bit distribution per tone, QLN per tone, a nonlinearity indicator, etc.

In addition to the identified data types that are typically available (or computable) from DSLAM/CPE modems, element-management systems (EMSs) or Auto Configuration Servers (ACSs), a timestamp parameter can be helpful. A timestamp memorializes when the telephone ringing voltage arrives. However, such a ring timestamp is usually unavailable to DSL systems because the timestamp is contained in different management or billing systems at the telephone company, or may not even belong to the DSL service provider (for example, where that service provider is not a telco or the like). In such cases, the ring timestamp may also be inferred from DSL operational data such as those listed above. As mentioned above, a 6PT box causes a problem when the telephone rings. Therefore, if the telephone ring timestamp is part of one of the methods for disruptive network device detection, detection performance can improve substantially (that is, the detection-rate/false positive probability reduces). To help illustrate this, two exemplary methods are discussed herein: one which uses the ring time stamp and the other does not use the time stamp.

As will be appreciated by those skilled in the art, if the timestamp is found to be necessary while call records are not available, then the detection methodology can include a step (automatic or manual) that calls the telephone number of the customer's line. Data is then collected for the time of that known call. Thus, while call records are not available, a simple solution conceptually is to call the phone at the time that a collection is underway.

Figure 6:
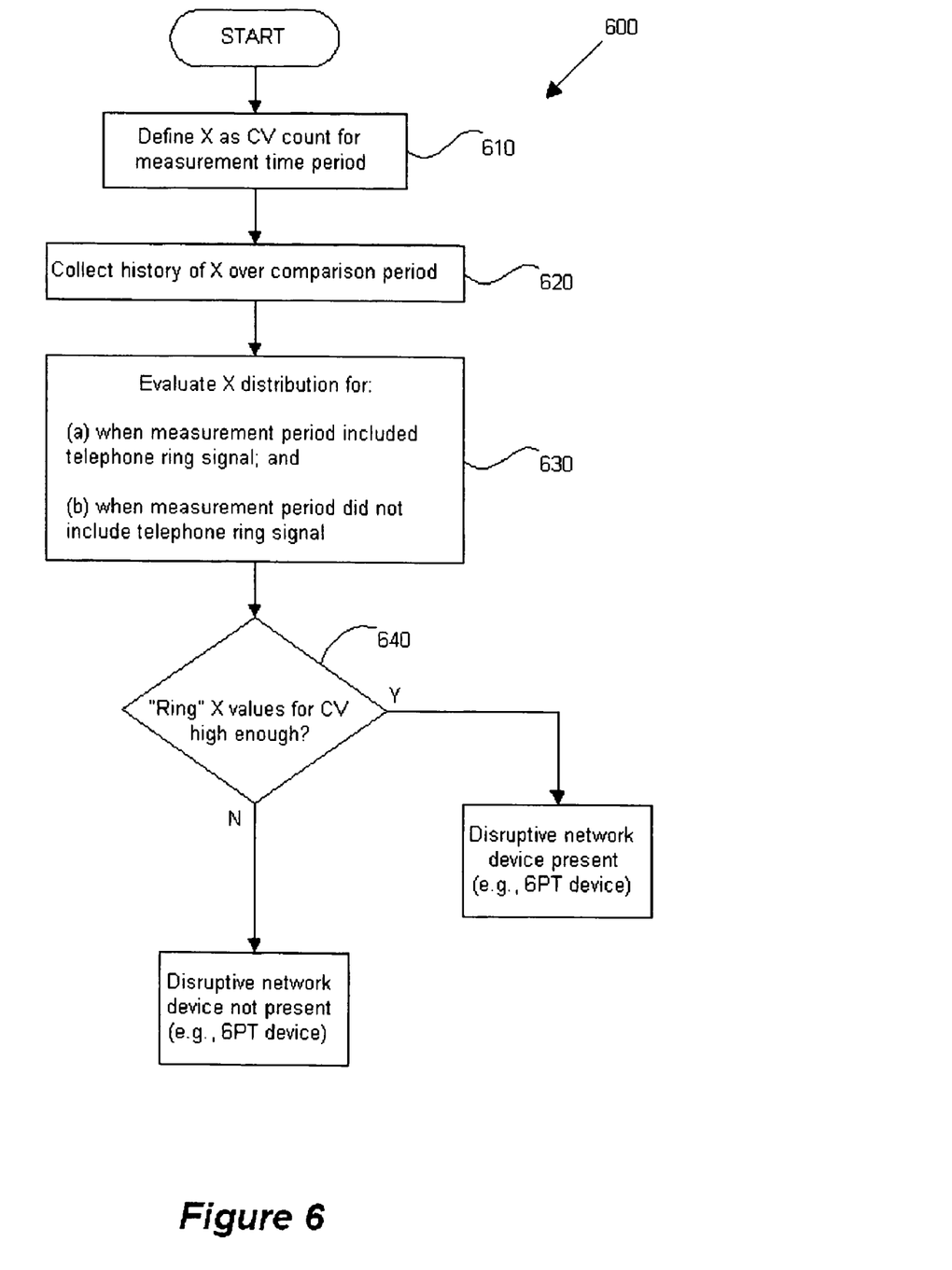
FIG. 6 illustrates one or more methods implementing embodiments of the present invention.

According to one embodiment of the present invention, when a ring timestamp is available (for the incoming telephone ring voltage occurrence), a missing splitter or disruptive network device on the telephone line can be detected by evaluating whether the DSL service error level increases during the telephone ringing. FIG. 6 illustrates this where at 610 X is defined as the number of code violations per measurement period (for example, 15 minutes). At 620 a history of X is collected over a selected comparison period (for example, 10 days). The distribution of X is then evaluated for two cases at 630, when the telephone rang for a particular X measurement period and when the telephone did not ring during such a measurement period. At 640 an evaluation is made as to whether X is sufficiently higher during measurement periods when the telephone rang (for example, a comparison can be made of the mean or median value of X and the $90^{th}$-percentile value for X). Variations of process 600 can include using one or more other measurement parameters (for example, errored seconds or FEC corrections) instead of or in combination with CV measurements.

Figure 7:
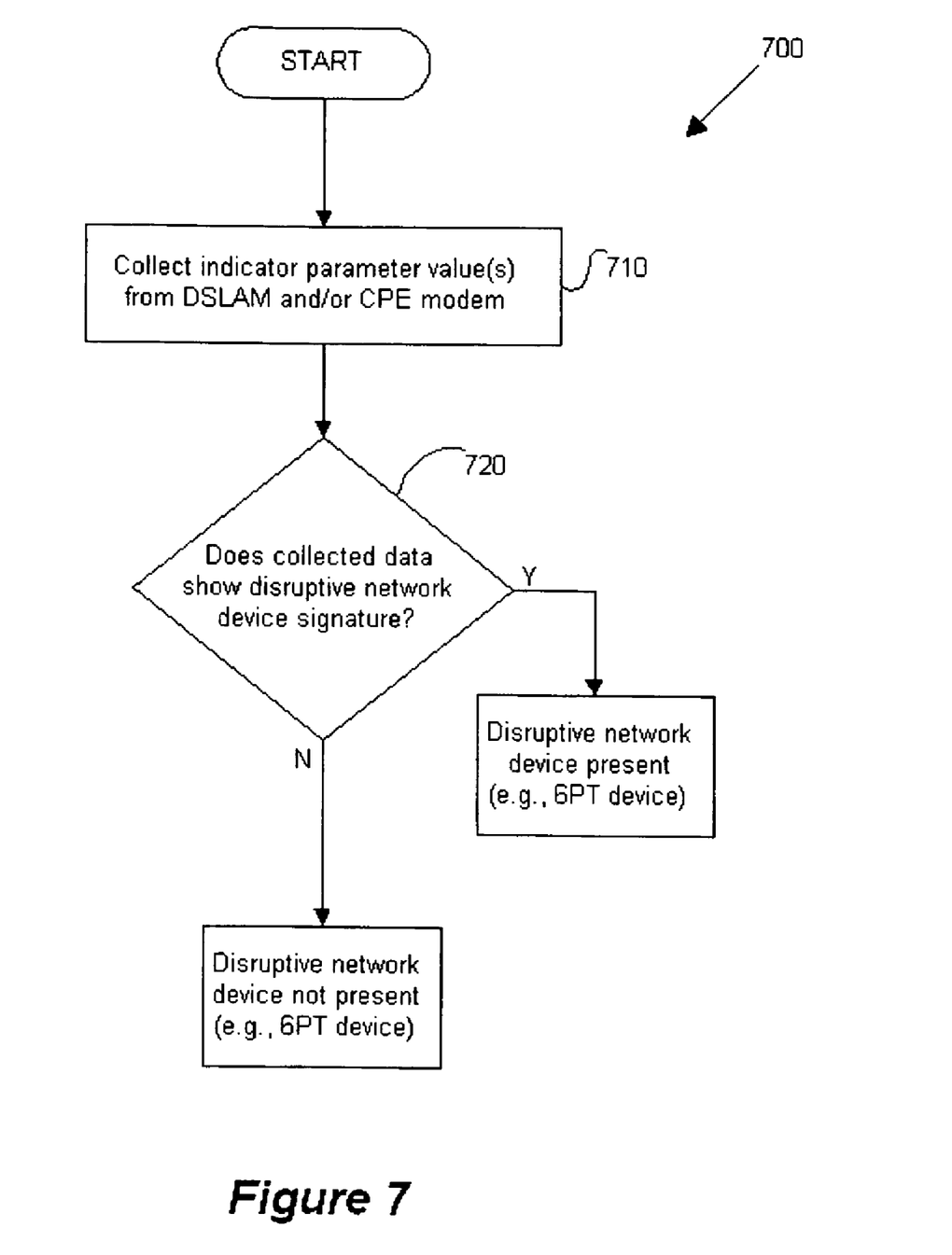
FIG. 7 illustrates one or more methods implementing embodiments of the present invention.

When the timestamp is not available, the missing splitter or disruptive network device detection can use parameter information available from the DSLAM/CPE modem. Because given DSLAM/CPE modem pairs might produce these parameters differently, a qualification process can be implemented before applying the disruptive network device detection to the subject network. As seen in the exemplary process 700 of FIG. 7, one or more parameters are collected from the DSLAM and/or CPE modem at 700. If these parameters show at 720 one or more signatures that occur only with a missing splitter or disruptive network device (for example, a 6PT box), then declare that the 6PT box exists. A "signature" can be characterized as a recognizable pattern in the collected data (for example, CVs, FEC corrections, bit distributions, etc.) that indicate 6PT or other disruptive network device presence with high probability—that is, if certain parameters show the relationship that indicates the existence of a 6PT or other disruptive network device, then one signature is observed. Characteristics of DSL equipment can be collected after being determined empirically (as described, for example, in U.S. Ser. No. 10/981,068, or can be obtained from the manufacturers of that equipment and maintained in a database, library, etc. In embodiments of the present invention, if certain parameters show different values/trends/relationships depending on the existence of a 6PT box or other disruptive network device or on the absence of a splitter, the parameters can be interpreted as a signature. For example, upstream and/or downstream attenuation might show different values/relationships depending on the existence of a disruptive network device. Also, bit distributions might show different values/relationships depending on the existence of a disruptive network device or on the absence of a splitter. Finally, non-linear indicators might show different values, depending on the existence of the 6PT box or other disruptive network device. For example, if the 6PT box is present on the telephone line, then the line shows non-linearity, so the non-linearity indicator would be turned on. In some cases, DSL modem bit loading tends to function differently in assigning bit distributions when a disruptive network device is present on the subject telephone line (for example, assigning more bits to a given frequency range as compared to bit loading when no disruptive network device is present on the line) or when a splitter is missing. A database of bit distribution deviations induced by a disruptive network device or a missing splitter can be generated for different CPE-DSLAM manufacturer combinations and can even provide such deviations for various loop lengths. Often, an unusual offset can indicate a strong likelihood of the presence of a disruptive network device such as a 6PT device or a missing splitter. Field information can help refine such a database, so that feedback from actual use with correct/incorrect disruptive network device detection/repair can be used as successive and/or additional refinement of a method for detection when a ring timestamp is unavailable.

In another example, this time using upstream and downstream attenuation parameters, the following numeric values for this particular DSLAM/CPE modem are observed when a 6PT box is present on the telephone line:

| Distance | Attenuation US with 6PT box | Attenuation DS with 6PT box | Attenuation US w/o 6PT box | Attenuation DS w/o 6PT box |
| --- | --- | --- | --- | --- |
| 0.5 km | 7.50 dB | 8.58 dB | 7.00 dB | 7.93 dB |
| 2.0 km | 15.5 dB | 34.2 dB | 13 dB | 33.93 dB |

The following rules can detect the 6PT box for this particular example.
When the upstream attenuation is from 7.00 dB to 8.00 dB, declare that the 6PT box is present if the downstream attenuation is larger than the upstream attenuation by more than 1.00 dB.
When the upstream attenuation is from 13 dB to 16 dB, declare that the 6PT box is present if the downstream attenuation is less than 2.5 times of the upstream attenuation.

Essentially a table is constructed with upstream and downstream attenuation values as inputs and expected differences when a 6PT box is not present are stored. If the deviation exceeds this expected deviation in the table, then the 6PT device is declared detected. As will be appreciated by those skilled in the art, combination of this method with bit distribution can improve accuracy. When a 6PT device is declared present, a call to the customer's phone and running of one of the above methodologies can confirm the presence of the disruptive network device.

Generally, embodiments of the present invention employ various processes involving data stored in or transferred through one or more computer systems. Embodiments of the present invention also relate to a hardware device or other apparatus for performing these operations. This apparatus may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the required method steps. A particular structure for a variety of these machines will be apparent to those of ordinary skill in the art based on the description given below.

Embodiments of the present invention as described above employ various process steps involving data stored in computer systems. These steps are those requiring physical manipulation of physical quantities. Usually, though not necessarily, these quantities take the form of electrical or magnetic signals capable of being stored, transferred, combined, compared and otherwise manipulated. It is sometimes convenient, principally for reasons of common usage, to refer to these signals as bits, bitstreams, data signals, control signals, values, elements, variables, characters, data structures or the like. It should be remembered, however, that all of these and similar terms are to be associated with the appropriate physical quantities and are merely convenient labels applied to these quantities.

Further, the manipulations performed are often referred to in terms such as identifying, fitting or comparing. In any of the operations described herein that form part of the present invention these operations are machine operations. Useful machines for performing the operations of embodiments of the present invention include general purpose digital computers or other similar devices. In all cases, there should be borne in mind the distinction between the method of operations in operating a computer and the method of computation itself. Embodiments of the present invention relate to method steps for operating a computer in processing electrical or other physical signals to generate other desired physical signals.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks;

magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 8:
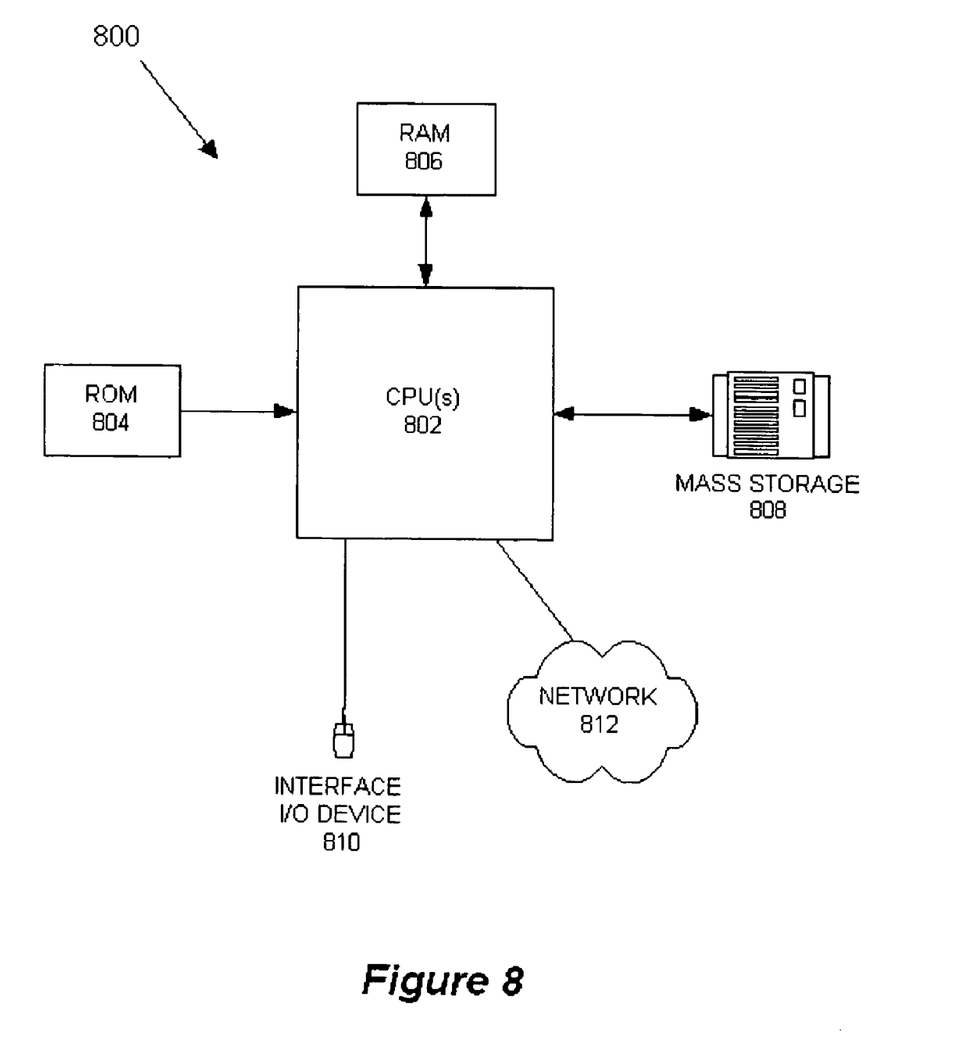
FIG. 8 is a block diagram of a typical computer system suitable for implementing embodiments of the present invention.

FIG. 8 illustrates a typical computer system that can be used by a user and/or controller in accordance with one or more embodiments of the present invention. The computer system 800 includes any number of processors 802 (also referred to as central processing units, or CPUs) that are coupled to storage devices including primary storage 806 (typically a random access memory, or RAM), primary storage 804 (typically a read only memory, or ROM). The CPU and some of the components of system 800 may also be implemented as an integrated circuit or chip that is a single device capable of being used in embodiments of the present invention. As is well known in the art, primary storage 804 acts to transfer data and instructions uni-directionally to the CPU and primary storage 806 is used typically to transfer data and instructions in a bi-directional manner. Both of these primary storage devices may include any suitable of the computer-readable media described above. A mass storage device 808 also is coupled bi-directionally to CPU 802 and provides additional data storage capacity and may include any of the computer-readable media described above. The mass storage device 808 may be used to store programs, data and the like and is typically a secondary storage medium such as a hard disk that is slower than primary storage. It will be appreciated that the information retained within the mass storage device 808, may, in appropriate cases, be incorporated in standard fashion as part of primary storage 806 as virtual memory. A specific mass storage device such as a CD-ROM 814 may also pass data uni-directionally to the CPU.

CPU 802 also is coupled to an interface 810 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 802 optionally may be coupled to a computer or telecommunications network using a network connection as shown generally at 812. With such a network connection, it is contemplated that the CPU might receive information from the network, or might output information to the network in the course of performing the above-described method steps. The above-described devices and materials will be familiar to those of skill in the computer hardware and software arts. The hardware elements described above may define multiple software modules for performing the operations of this invention. For example, instructions for running a controller may be stored on mass storage device 808 or 814 and executed on CPU 802 in conjunction with primary memory 806. In some embodiments, the controller can be divided into software submodules. The many features and advantages of the present invention are apparent from the written description, and thus, the appended claims are intended to cover all such features and advantages of the invention. Further, since numerous modifications and changes will readily occur to those skilled in the art, the present invention is not limited to the exact construction and operation as illustrated and described. Therefore, the described embodiments should be taken as illustrative and not restrictive, and the invention should not be limited to the details given herein but should be defined by the following claims and their full scope of equivalents, whether foreseeable or unforeseeable now or in the future.

What is claimed is:

1. A method of detecting and mitigating a condition which adversely impacts a digital subscriber line service (DSL) over a telephone line shared by the DSL service and a telephone service, comprising:
   obtaining information regarding operation of the DSL service over a plurality of different time periods;
   comparing the information for a first of the plurality of time periods during which an event is present on the line with the information for a second of the plurality of time periods, wherein the event can trigger or indicate existence of the condition;
   determining the condition exists based on the comparison; and
   modifying the event to minimize the extent to which the event can trigger existence of the condition when present on the line.

2. The method of claim 1, wherein the event is a telephone ring signal and wherein the event is absent during the second of the plurality of time periods, the method further comprising obtaining a telephone ring signal timestamp to identify the first time period during which the telephone ring signal is present on the line.

3. The method of claim 1, wherein obtaining information regarding operation of the DSL service over a plurality of different time periods comprises obtaining the information from at least one of a DSL access multiplexor (DSLAM) and a customer premises equipment (CPE) modem.

4. The method of claim 1, wherein the information regarding operation of the DSL, service includes one or more of the following parameters: upstream code violations, downstream code violations, upstream forward error correction (FEC) codeword-correction indicators, downstream FEC codeword-connection indicators, upstream errored seconds, downstream errored seconds, upstream attenuation, downstream attenuation, upstream margin, downstream margin, Hlog per tone, bit distribution per tone, QLN per tone, and a non-linearity indicator.

5. The method of claim 4, wherein determining the condition exists based on the comparison comprises determining the condition exists when the comparison indicates a value for at least one of the parameters increases significantly during the first time period as compared to the second time period.

6. The method or claim 1, wherein the event is at least one of a non-linear disturbance on the line, or is further present during the second plurality of time periods.

7. An apparatus comprising:
   voiceband equipment;
   a digital subscriber line (DSL) modem;
   a splitter coupled to the voiceband equipment, the DSL modem, and a network device to pass low frequency signals received from a telephone line coupled to the network device to the voiceband equipment and to pass high frequency signals received from the telephone line to the DSL modem; and
   a management entity to:
   obtain information regarding operation of a DSL, service involving the DSL modem and the telephone line over a plurality of different time periods;
   compare the information for a first of the plurality of time periods during which an event is present on the line with the information for a second of the plurality of time periods, wherein the event can trigger or indicate existence of the condition;
   determine the condition exists based on the comparison; and modify the event to minimize the extent to which the event can trigger existence of the condition when present on the line.

8. The apparatus of claim 7 wherein the existence of the condition comprises the splitter malfunctioning, or the network device disrupting the telephone line.

9. The apparatus of claim 7, further comprising a conditioning device coupled to the telephone line to minimize the extent to which the event can trigger existence of the condition when present on the line.

10. The apparatus of claim 9, wherein the conditioning device is at least one of a telephone ring signal conditioning device that modifies the ring signal such that it minimizes disruption introduced by the network device or an impedance conditioning device that modifies impedance to minimize disruption introduced by the network device.

11. The apparatus of claim 10, wherein the telephone ring signal conditioning device can be coupled in parallel between the splitter and the voiceband equipment, integrated in series in the voiceband equipment, integrated into the splitter, integrated into the DSL modem, or integrated with the splitter into the DSL, modem.

12. The apparatus of claim 11, wherein the telephone ring signal conditioning device is to reduce high voltage effects that might otherwise cause the network device to operate in a manner that adversely affects the operation of the DSL service.

13. The apparatus of claim 10, wherein the telephone ring signal conditioning device comprises:
a connector that couples the ring signal conditioning device to the telephone line wherein the connector may be dedicated to the ring signal conditioning device or shared with the voiceband equipment, splitter, or DSL modem; and
a ring signal modification circuit coupled to the connector to mitigate DSL modem operation problems created by a disruptive network device and high voltage in the telephone ring signal, wherein the impedance,
or wherein the impedance conditioning device comprises:
a connector to connect the impedance conditioning device to the telephone line, wherein the connector may be dedicated to the impedance conditioning device or shared with the voiceband equipment, splitter, or DSL, modem; and
an impedance modification circuit coupled to the connector to mitigate DSL modem operation problems created by a disruptive network device.

14. The apparatus of claim 13, wherein the ring signal modification circuit is to have an effect on the ring signal that is inversely proportional to a length of the telephone line, or the impedance modification circuit is to have an effect on a ring signal that is inversely proportional to the length of the telephone line.

15. The apparatus of claim 10, wherein the impedance conditioning device is to lower or otherwise modify impedance terminating at the DSL, modem as a result of any non-linear disturbance on the telephone line.

* * * * *